United States Patent [19]

Tachihara et al.

[11] Patent Number: 5,781,350
[45] Date of Patent: Jul. 14, 1998

[54] OBJECTIVE LENS FOR ENDOSCOPE

[75] Inventors: Satoru Tachihara; Takashi Koeda, both of Tokyo, Japan

[73] Assignee: Asahi Kogaku Kogyo Kabushiki Kaisha, Tokyo, Japan

[21] Appl. No.: 738,704

[22] Filed: Oct. 28, 1996

Related U.S. Application Data

[63] Continuation of Ser. No. 377,331, Jan. 24, 1995, abandoned.

[30] Foreign Application Priority Data

Jan. 27, 1994 [JP] Japan ................... 6-007911

[51] Int. Cl.$^6$ ............... G02B 9/58; G02B 21/02; G02B 9/00
[52] U.S. Cl. ................ 359/782; 359/660; 359/740
[58] Field of Search ................ 359/656, 657, 359/658, 659, 660, 740, 770, 771, 708, 713, 714, 715, 716, 781, 782, 784, 773, 766

[56] References Cited

U.S. PATENT DOCUMENTS

| | | | |
|---|---|---|---|
| 4,037,938 | 7/1977 | Yamashita et al. | 359/734 |
| 4,042,295 | 8/1977 | Yamashita et al. | 359/735 |
| 4,059,344 | 11/1977 | Yamashita | 359/783 |
| 4,359,271 | 11/1982 | Mihara | 359/715 |
| 4,403,837 | 9/1983 | Nakahashi | 359/770 |
| 4,493,537 | 1/1985 | Nakahashi | 359/783 |
| 4,606,607 | 8/1986 | Kurihara | 359/715 |
| 4,674,844 | 6/1987 | Nishioka et al. | 359/782 |
| 4,764,001 | 8/1988 | Yokota | 359/708 |
| 4,806,001 | 2/1989 | Okabe et al. | 359/708 |
| 4,867,546 | 9/1989 | Nishioka et al. | 359/714 |
| 4,979,808 | 12/1990 | Yamagata et al. | 359/740 |
| 5,050,974 | 9/1991 | Takasugi et al. | 359/728 |
| 5,087,989 | 2/1992 | Igarashi | 359/692 |
| 5,175,650 | 12/1992 | Takayama et al. | 359/716 |
| 5,198,931 | 3/1993 | Igarashi | 359/660 |
| 5,208,702 | 5/1993 | Shiraiwa | 359/663 |
| 5,223,982 | 6/1993 | Suzuki et al. | 359/716 |
| 5,296,971 | 3/1994 | Mori | 359/716 |
| 5,345,338 | 9/1994 | Ueda et al. | 359/679 |
| 5,547,457 | 8/1996 | Tsuyuki et al. | 600/175 |

FOREIGN PATENT DOCUMENTS 406059189  3/1994  Japan.

*Primary Examiner*—Georgia Y. Epps
*Assistant Examiner*—Jordan M. Schwartz
*Attorney, Agent, or Firm*—Greenblum & Bernstein P.L.C.

[57] ABSTRACT

An objective lens for an endoscope including a first lens group including one negative lens, a second lens group having a positive power, a third lens group having a negative power, and an aperture stop provided between the first lens group and the second lens group. The objective lens satisfies the relationships:

$$-1.4 < f_1/f < -0.5,$$

$$0.55 < f_2/f < 0.85;$$

and $$f_3/f < -2.0,$$

Where f designates a focal length of the entire objective lens; $f_1$ designates a focal length of the first lens group; $f_2$ designates a focal length of the second lens group; and $f_3$ designates a focal length of the third lens group.

12 Claims, 7 Drawing Sheets

OBJECTIVE LENS FOR ENDOSCOPE

This application is a continuation of application Ser. No. 08/377,331, filed Jan. 24, 1995, now abandoned.

BACKGROUND OF THE INVENTION

1. Field of the Invention

The present invention relates to an objective lens for a medical or industrial endoscope.

2. Description of Related Art In an objective lens for an endoscope, a negative lens having a high power is usually provided at a front end of the objective lens to obtain a wide angle of field. This inevitably causes a negative distortion. In particular, a considerable negative distortion occurs at first surface of frontmost negative lens. It has been proposed to decrease the radius of curvature of the first surface of the frontmost negative lens in order to reduce the negative distortion. However, the decreased radius of curvature of the first surface tends to cause water drops to remain on the first surface, and accordingly, the proposal is not practicable.

It has been also proposed to incorporate an aspherical lens within the lens system to reduce the distortion. This however increases the manufacturing cost of the objective lens.

SUMMARY OF THE INVENTION

A primary object of the present invention is to provide an inexpensive objective lens for an endoscope, in which the above-noted distortion can be reduced.

The basic concept of the present invention resides in a lens arrangement that requires no expensive aspherical lens or that the spherical lens elements, constituting the lens arrangement, must meet to reduce the distortion.

To achieve the object mentioned above, according to an aspect of the present invention, there is provided an objective lens for an endoscope including a first lens group having of one negative lens, a second lens group having a positive power, a third lens group having a negative power, and an aperture-stop provided between the first lens group and the second lens group.

Preferably, the objective lens satisfies the relationships:

$$-1.4 < f_1/f < -0.5 \tag{1}$$

$$0.55 < f_2/f < 0.85 \tag{2}$$

$$f_3/f < -2.0 \tag{3}$$

wherein f designates a focal length of the entire objective lens,
$f_1$ designates a focal length of the first lens group,
$f_2$ designates a focal length of the second lens group,
$f_3$ designates a focal length of the third lens group.

The second lens group can include one positive lens and a cemented lens pair including a positive and a negative lenses.

The third lens group is preferably comprises of a negative meniscus lens having a convex surface that faces an object side. Preferably, the negative meniscus lens satisfies the relationships:

$$0.7 < R_L/f < 1.2; \tag{4}$$

and $$1.2 < L_A/f < 2.5 \tag{5}$$

wherein $R_L$ designates a radius of curvature of an image-side surface of the negative meniscus lens, and $L_A$ designates a distance between the image-side surface of the negative meniscus lens and the aperture stop.

The present disclosure relates to subject matter contained in Japanese patent application No. HEI 6-7911 (filed on Jan. 27, 1994).

BRIEF DESCRIPTION OF THE DRAWINGS

The invention will be described below in detail with reference to the accompanying drawings, in which.

DESCRIPTION OF THE PREFERRED EMBODIMENT

In general, a large amount of distortion occurs in a surface located far from an aperture stop. As mentioned above, if a negative lens is located at a front end of an objective lens, i.e., closest to an object to be observed, a large degree of negative distortion occurs on the first lens surface located farthest from the aperture stop. Consequently, it is necessary to produce a positive distortion on the lens surface other than the first lens surface to cancel or reduce the negative distortion.

To this end, if a lens having a positive power is placed closer to the object to be observed than the aperture stop in order to produce a positive distortion that cancels or reduces the negative distortion, a technical effect to increase the angle of field of the negative lens can no be longer expected, and hence, its performance as an objective lens for an endoscope cannot be obtained.

Under these circumstances, in the present invention, a negative lens is located as far from the aperture stop on the image side as possible to produce a positive distortion on a surface located closer to an image than the aperture stop, to thereby cancel the negative distortion.

It is necessary for an objective lens system, as a whole, to have a positive power. To this end, a positive lens group is provided between the negative lens located far from the aperture stop on the image side first lens group including a negative lens. Namely, the objective lens according to the present invention comprises the first negative lens group, a second positive lens group and a third negative lens group.

Namely, in an objective lens for an endoscope according to the present invention, the first lens group is made of a negative lens to obtain a wide angle of field;

the second lens group is made of a lens group having a positive power, so that the objective lens has a positive power; and, the third lens group is made of a lens having a negative power to correct a large amount of negative distortion caused by the first lens group.

In this arrangement, the negative lens of the third lens group preferably comprises a meniscus lens having a convex surface that faces the object side. The convex surface of the meniscus lens provides a difference in the angle of refraction of an off-axis principal ray between a first and a second lens surface thereof, to thereby enhance the distortion correcting effect. Furthermore, the meniscus lens contributes to a reduction of a Petzval sum to restrict the curvature of the field.

Furthermore, the inventors of the present invention have conceived the requirements defined by formulae (1) through (5), mentioned above, to obtain a better optical performance as an objective lens for an endoscope.

Formula (1) specifies the power of the first lens group. The negative lens of the first lens group is adapted not only to increase the angle of field of the whole lens system, but also to correct aberrations, such as a spherical aberration, chromatic aberration, and curvature of the field, caused by the second lens group having a strong positive power.

If value of the formula (1) is larger than the upper limit, the power is so strong that a large amount of negative distortion occurs. Conversely, if the value is smaller than the lower limit, the power is so weak that the angle of field is too small, although the distortion can be effectively restricted. Moreover, under-corrected aberrations caused in the second lens group cannot be corrected, thus resulting in a deteriorated image.

Formula (2) specifies the power of the second lens group. In the whole lens system, it is only the second lens group that has a positive power and contributes to a formation of an object image. Namely, the second lens group has a power strong enough to cancel the negative power of the first lens group, so that the whole lens system has a positive power and causes under-corrected aberrations, as mentioned above. Formula (2) also specifies the requirement to make the whole lens system compact in connection with the formula (1).

If value of the formula (2) exceeds the upper limit, the power is so weak that a length of the whole lens system increases, although the amount of aberration is reduced. Also, if the power of the second lens group is so weak that the value of formula (2) exceeds the upper limit, it is necessary to reduce the negative power of the first lens group accordingly in order to keep the power of the whole lens system constant. Consequently, the angle of field is too small to be practically accepted as an objective lens for an endoscope.

Conversely, if the value of formula (2) is smaller than the lower limit, the power of the second lens group is so strong that there is a particularly large amount of spherical aberration and curvature of the field. This results in a decreased contrast of an object image and deterioration of uniform image quality over the entire image. To prevent this, it is theoretically possible to increase the negative power of the first lens group. However, in this solution, the distortion is increased, which is not preferable.

Formula (3) specifies the power of the third lens group. The third lens group has a power weaker than the powers of the first and second lens groups, so as to have less influence on the image forming factors other than the distortion. If the value of formula (3) is above the upper limit, the power of the third lens group is too strong to correct astigmatism and transverse chromatic aberrations, which is not advisable in view of the image quality of the off-axis rays.

Formula (4) specifies a radius of curvature of the lens surface of the negative meniscus lens of the third lens group that is located on the image side. The requirement defined in formula (4) is necessary to effectively correct distortion, in connection with the requirement defined in formula (3). If the radius of curvature of the surface of the third lens group that is located adjacent to the image side is determined to meet the requirement defined in formula (4), there is a difference in the angle of refraction of the off-axis rays between the first and second lens surfaces of the meniscus lens, so that the negative distortion caused by the first lens group can be cancelled by the positive distortion caused on the second lens surface. In other words, if the power of the third lens group is reduced, it is possible to provide a difference in height of the off-axis rays on the first and second lens surfaces to thereby provide a difference in the angle of refraction of the off-axis rays between the first and second lens surfaces, so long as the third lens group has an appropriate thickness and meets the requirement defined in formula (4) discussed below. Hence, the distortion can be effectively corrected.

If the value of formula (4) exceeds the upper limit, the radius of curvature is so large that the difference in the angle of refraction is too small to produce an amount of positive distortion enough to cancel the negative distortion. If the value is smaller than the lower limit, the radius of curvature is reduced so that the large amount of positive distortion can be produced, but it is practically difficult to manufacture a meniscus lens having such a small radius of curvature. In addition to the difficulty, there is a possibility of a mechanical contact of the peripheral edge of the negative meniscus lens with an end surface of a bundle of fibers located at the image surface or a surface of an associated CCD, etc., which is not preferable.

Formula (5) specifies a distance between an aperture stop and the lens surface of the negative meniscus lens that is located on the image side. As mentioned above, positive distortion is caused by the lens surface of the negative meniscus lens on the image side so as to cancel the negative distortion of the first lens group. To enhance the cancellation effect, the lens surface should be spaced from the aperture stop as much as possible. However, if the distance is so large that the value of formula (5) exceeds the upper limit, the length of the whole lens system increases, which would not allow for a compact lens. If the value of formula (5) is below the lower limit, the lens surface of the negative meniscus lens on the image side is too close to the aperture stop to correct the negative distortion.

To reduce the whole lens length and the number of the lens elements, to thereby curtail the manufacturing cost, the second lens group preferably comprises one positive sub-lens (IIa sub-lens) and a cemented sub-lens (IIb sub-lens), consisting of a pair of positive and negative lenses.

To obtain a better optical performance, the lens system preferably satisfies the following relationships:

$$-0.75 < R_A/f < -0.55; \quad (6)$$

$$0.50 < |R_B|/f < 1.30; \quad (7)$$

and $$1.67 < N_2, \quad (8)$$

wherein $R_A$ designates a radius of curvature of the surface of the positive sub-lens of the second lens group, that is located on the image side, $R_B$ designates a radius of curvature of a cemented surface of the cemented sub-lens of the second lens group, and $N_2$ designates an average value of the refractive index of the positive sub-lens and the positive lens in the cemented sub-lens.

Formula (6) specifies the radius of curvature of the surface of the positive sub-lens belonging to the second lens group, that is located on the image side. If the lens system meets the requirements defined in formulae (2) and (6), the positive sub-lens of the second lens group is shaped such that the radius of curvature of the lens surface thereof located on the image side is small. Consequently, an appropriate amount of spherical aberration can be caused, so that the focal position on the axis is slightly shifted toward an object to be observed from a Gaussian image plane. Consequently, the bundle of off-axis rays which tend to occur due to an under-corrected abberation can be well balanced.

If the value of formula (6) exceeds the upper limit, the absolute value of the radius of curvature of the lens surface is so small, that is, the surface power is so strong that the amount of the under spherical aberration is too large to balance the axial rays and the off-axis rays. Moreover, there is an increased astigmatism which is not acceptable, depending on the purpose of usage. If the value of formula (6) is below the lower limit, the surface power is too small to obtain the necessary amount of under spherical aberration to balance the axial rays and the off-axis rays.

Formula (7) specifies a radius of curvature of a connecting surface (cemented surface) of the cemented sub-lens belonging to the second lens group. The connecting surface influences the balance of the axial chromatic aberration and the transverse chromatic aberration. If the value of formula (7) is above (or below) the upper limit (or lower limit), it is difficult to appropriately balance the axial chromatic aberration and the transverse chromatic aberration. Consequently, no optical performance of an objective lens for an endoscope can be obtained, depending on the purpose of usage thereof.

Formula (8) specifies a mean value of the refractive index of the positive lenses belonging to the second lens group. If the positive lenses of the second lens group are made of glasses having a mean refractive index which meets the requirement defined in formula (8), not only can the Petzval sum be restricted, but also the curvature of the field can be reduced. In connection with the requirement defined in formula (8), the requirement defined in formula (6) ensures that a good image quality can be obtained over the entire image surface. If the value of formula (8) is above the upper limit, it is difficult to obtain a good image quality over the entire image surface.

As mentioned above, according to the present invention, an objective lens having less distortion can be realized by spherical lenses in combination, without using an aspherical lens. However, it is possible to incorporate an aspherical lens in a basic arrangement of the present invention to enhance the distortion correcting effect or aberration correcting effect.

Several examples of numerical data will be discussed below. In the following seven embodiments, the objective lens system comprises a first negative lens group 11, a second positive lens group 12, a third lens group 13 made of a negative meniscus lens, and two plane-parallel plates 14 (including filter and glass cover, etc.), in this order from the object side. The second positive lens group 12 comprises of one positive sub-lens 12-1 and a cemented sub-lens consisting of a pair of positive and negative lenses 12-2 and 12-3. Aperture stop S is provided between the first lens group 11 and the second lens group 12. The thickness (or optical constant) of the plane-parallel plates 14 does not have a substantial influence on the optical efficiency of the objective lens system.

First Embodiment

Figure 1:
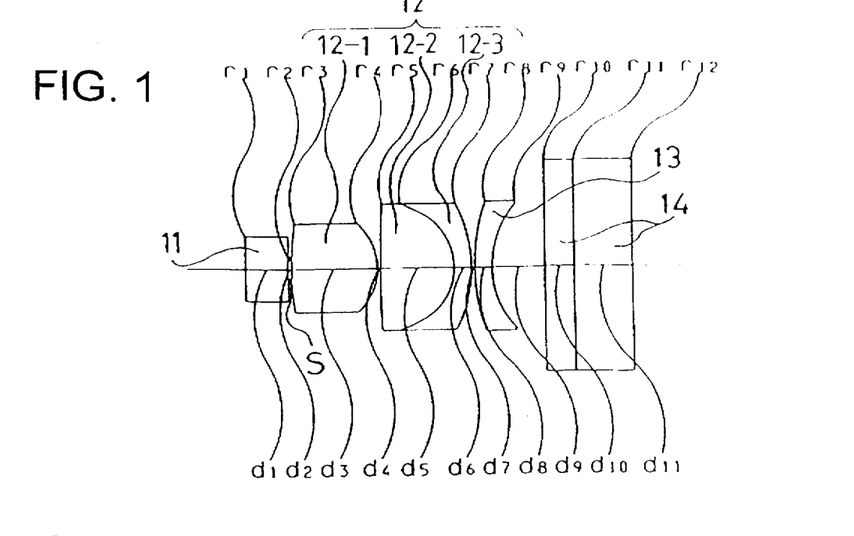
FIG. 1 is a schematic view of a lens arrangement of an objective lens for an endoscope, according to a first embodiment of the present invention.

FIG. 1 shows a lens arrangement of an objective lens, according to a first embodiment of the present invention.

Numerical data of the objective lens shown in FIG. 1 is shown in Table 1 below. Diagrams of various aberrations thereof are shown in FIG. 2.

Figure 2:
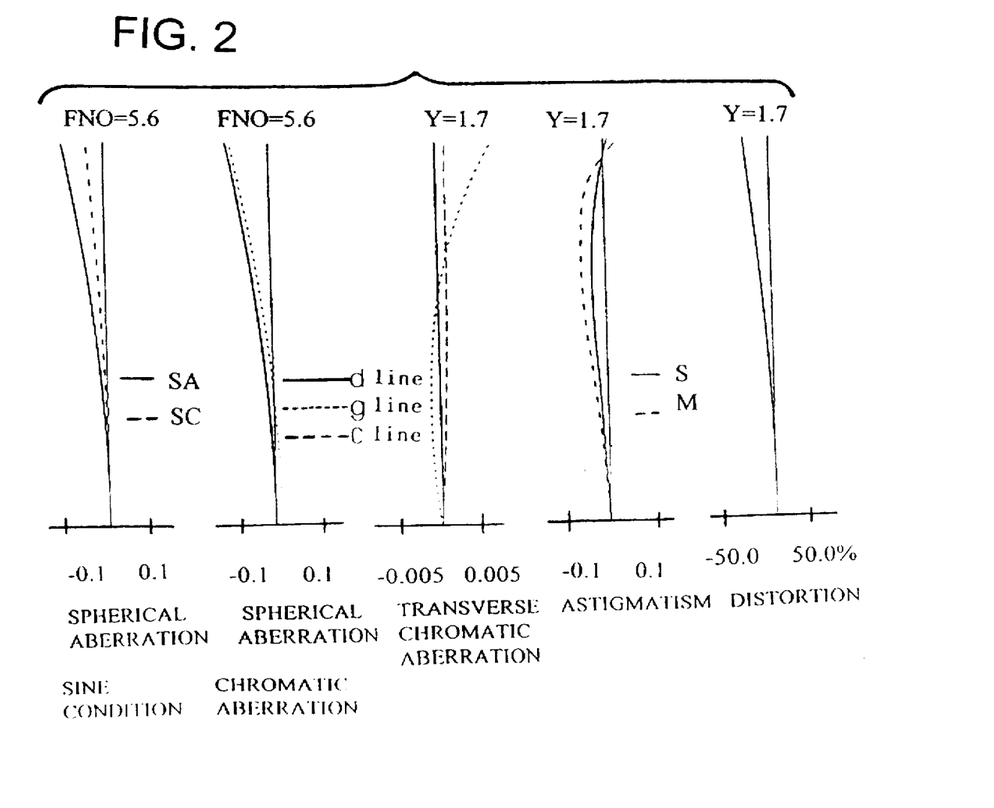
FIG. 2 shows various aberration diagrams of the objective lens shown in FIG. 1.

In FIG. 2, "SA" designates a spherical aberration, "SC" designates a sine condition, "d-line", "g-line" and "C-line" designates chromatic aberration represented by the spherical aberration and the transverse chromatic aberration, at the respective wavelengths, "S" designates a sagittal ray, and "M" designates a meridional ray.

In the Tables and the drawings, "$F_{NO}$" designates the f-number, "f" designates a focal length, "M" designates a lateral magnification, "$\Omega$" designates a half angle of view, "Y" designates an image height, "$r_i$" designates a radius of curvature of each lens surface, "$d_i$" designates a lens thicknesses or distance between the lenses, "N" designates a refractive index of the d-line, and "d" designates an Abbe number of the d-line, respectively.

TABLE 1

$F_{NO} = 1:5.6$
$f = 1.69$
$M = -0.143$
$\omega = 54.7°$
$Y = 1.7$

| surface No. | $r_i$ | $d_i$ | N | ν |
|---|---|---|---|---|
| 1 | ∞ | 0.72 | 1.88300 | 40.8 |
| 2 | 1.004 | 0.05 | — | — |
| STOP | ∞ | 0.02 | — | — |
| 3 | 5.325 | 1.43 | 1.78650 | 50.0 |
| 4 | -1.061 | 0.06 | — | — |
| 5 | 19.642 | 1.21 | 1.65160 | 58.5 |
| 6 | -1.073 | 0.30 | 1.84666 | 23.9 |
| 7 | -2.355 | 0.05 | — | — |
| 8 | 3.462 | 0.30 | 1.61293 | 37.0 |
| 9 | 1.657 | 0.87 | — | — |
| 10 | ∞ | 0.50 | 1.52400 | 69.0 |
| 11 | ∞ | 1.00 | 1.53996 | 59.5 |
| 12 | ∞ | — | — | — |

Second Embodiment

Figure 3:
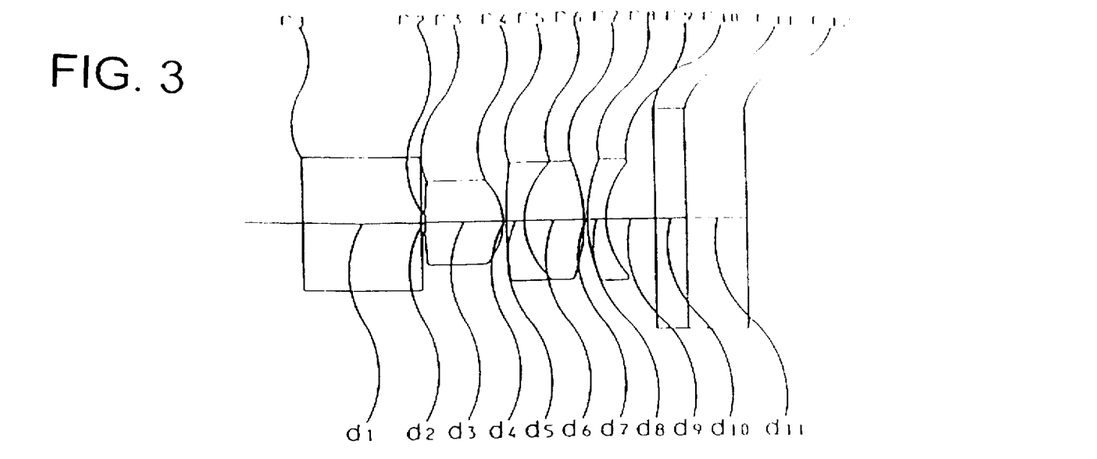
FIG. 3 is a schematic view of a lens arrangement of an objective lens for an endoscope, according to a second embodiment of the present invention.

FIG. 3 shows a lens arrangement of an objective lens according to a second embodiment of the present invention.

Figure 4:
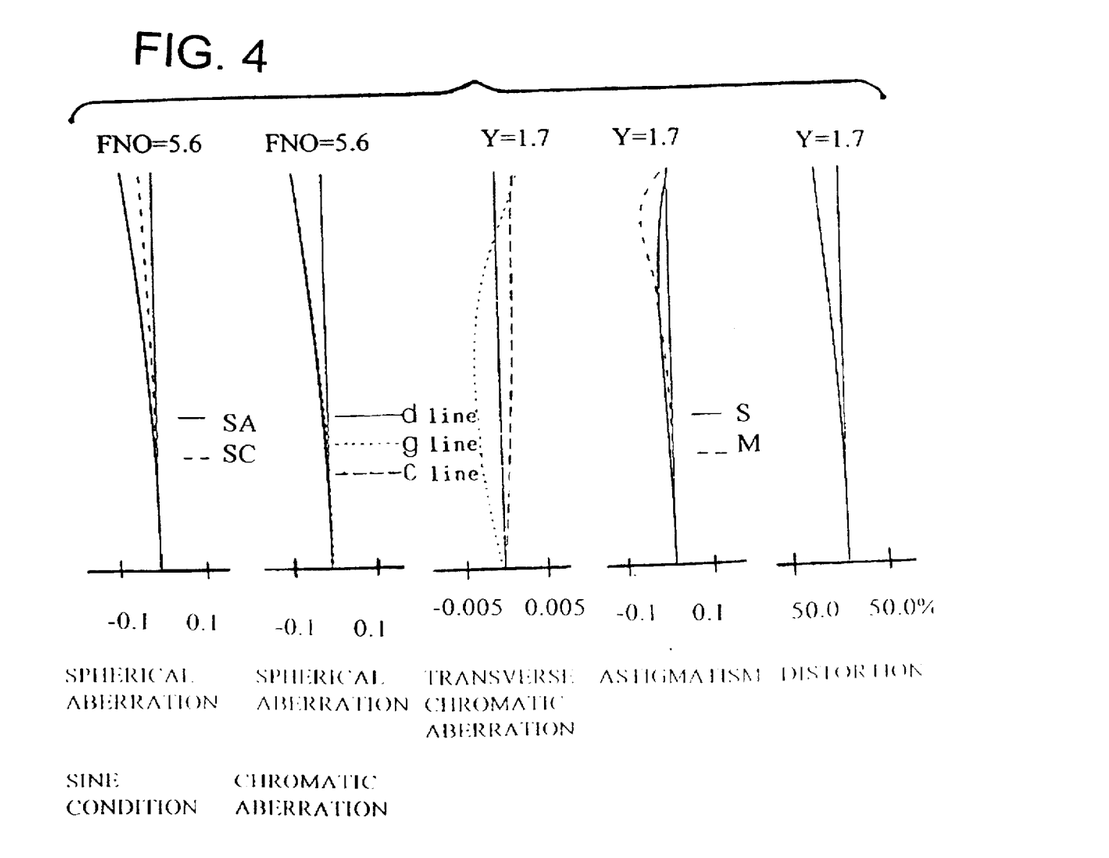
FIG. 4 shows various aberration diagrams of the objective lens shown in FIG. 3.

Numerical data of the lens system shown in FIG. 3 is shown in Table 2 below. Diagrams of various aberrations thereof are shown in FIG. 4.

TABLE 2

$F_{NO} = 1:5.6$
$f = 1.67$
$M = -0.135$
$\omega\ 54.2°$
$Y = 1.7$

| surface No. | $r_i$ | $d_i$ | N | ν |
|---|---|---|---|---|
| 1 | ∞ | 1.89 | 1.88300 | 40.8 |
| 2 | 1.141 | 0.06 | — | — |
| STOP | ∞ | 0.02 | — | — |
| 3 | 6.587 | 1.28 | 1.73520 | 41.1 |
| 4 | −1.092 | 0.05 | — | — |
| 5 | 7.305 | 0.30 | 1.80518 | 25.4 |
| 6 | 1.384 | 0.95 | 1.74100 | 52.7 |
| 7 | −3.099 | 0.05 | — | — |
| 8 | 2.715 | 0.30 | 1.74077 | 27.8 |
| 9 | 1.478 | 0.82 | — | — |
| 10 | ∞ | 0.50 | 1.52400 | 69.0 |
| 11 | ∞ | 1.00 | 1.53996 | 59.5 |
| 12 | ∞ | — | — | — |

Third Embodiment

Figure 5:
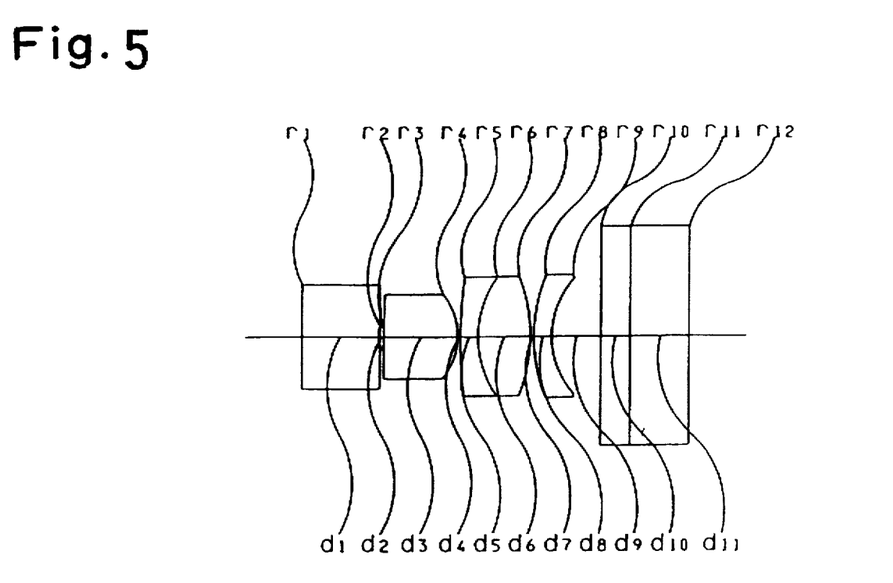
FIG. 5 is a schematic view of a lens arrangement of an objective lens for an endoscope, according to a third embodiment of the present invention.

FIG. 5 shows a lens arrangement of an objective lens according to a third embodiment of the present invention.

Figure 6:
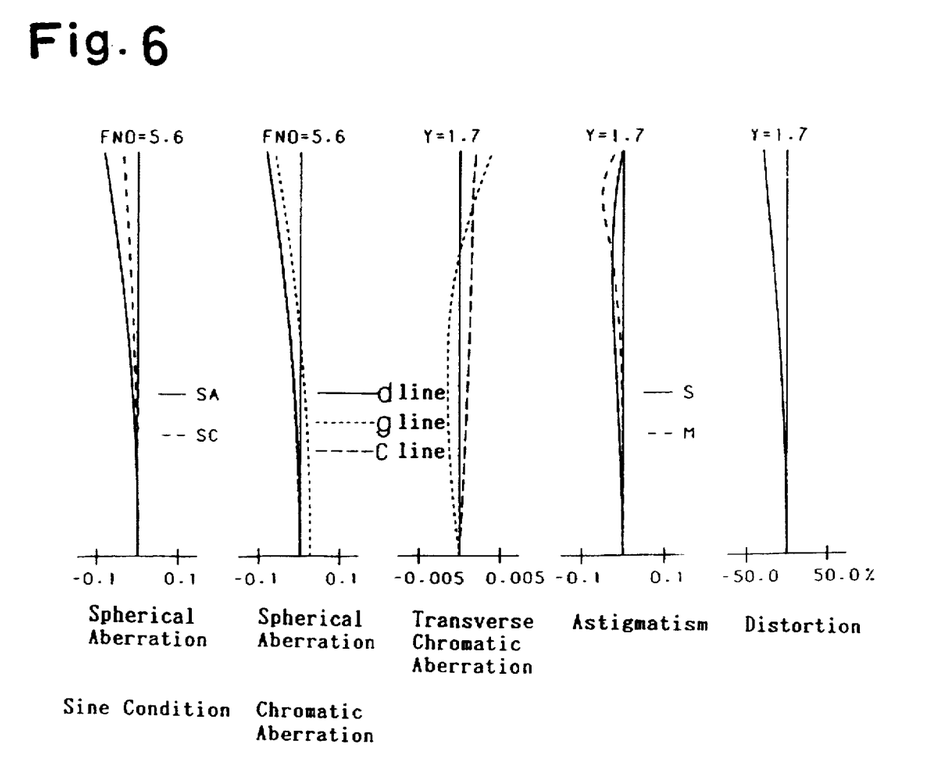
FIG. 6 shows various aberration diagrams of the objective lens shown in FIG. 5.

Numerical data of the lens system shown in FIG. 5 is shown in Table 3 below. Diagrams of various aberrations thereof are shown in FIG. 6.

TABLE 3

$F_{NO} = 1:5.6$
$f = 1.69$
$M = -0.140$
$\omega = 54.0°$
$Y = 1.7$

| surface No. | $r_i$ | $d_i$ | N | ν |
|---|---|---|---|---|
| 1 | ∞ | 1.35 | 1.88300 | 40.8 |
| 2 | 1.407 | 0.07 | — | — |
| STOP | ∞ | 0.02 | — | — |
| 3 | ∞ | 1.27 | 1.77250 | 49.6 |
| 4 | −1.158 | 0.05 | — | — |
| 5 | 7.916 | 0.30 | 1.80518 | 25.4 |
| 6 | 1.720 | 0.91 | 1.72916 | 54.7 |
| 7 | −2.782 | 0.05 | — | — |
| 8 | 2.841 | 0.30 | 1.75550 | 25.1 |
| 9 | 1.497 | 0.83 | — | — |
| 10 | ∞ | 0.50 | 1.52400 | 69.0 |
| 11 | ∞ | 1.00 | 1.53996 | 59.5 |
| 12 | ∞ | — | — | — |

Fourth Embodiment

Figure 7:
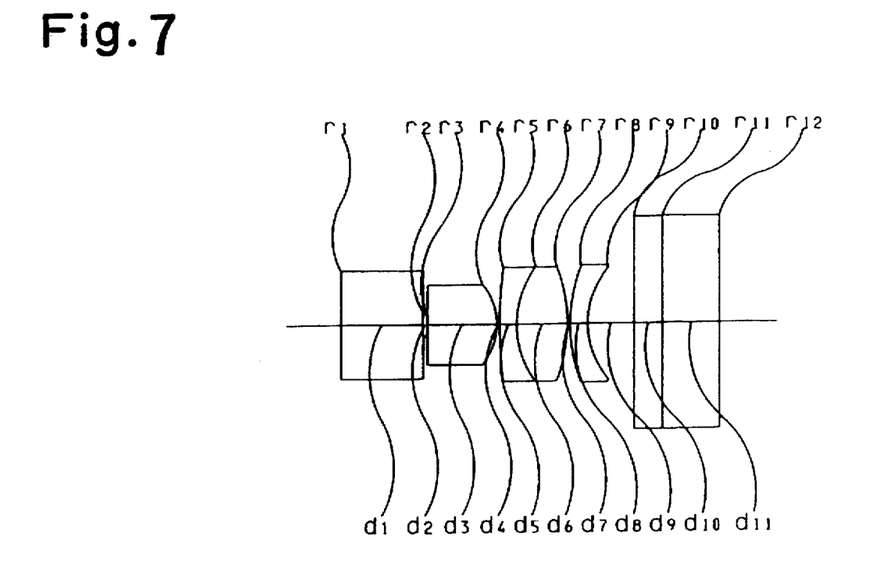
FIG. 7 is a schematic view of a lens arrangement of an objective lens for an endoscope, according to a fourth embodiment of the present invention.

FIG. 7 shows a lens arrangement of an objective lens according to a fourth embodiment of the present invention.

Figure 8:
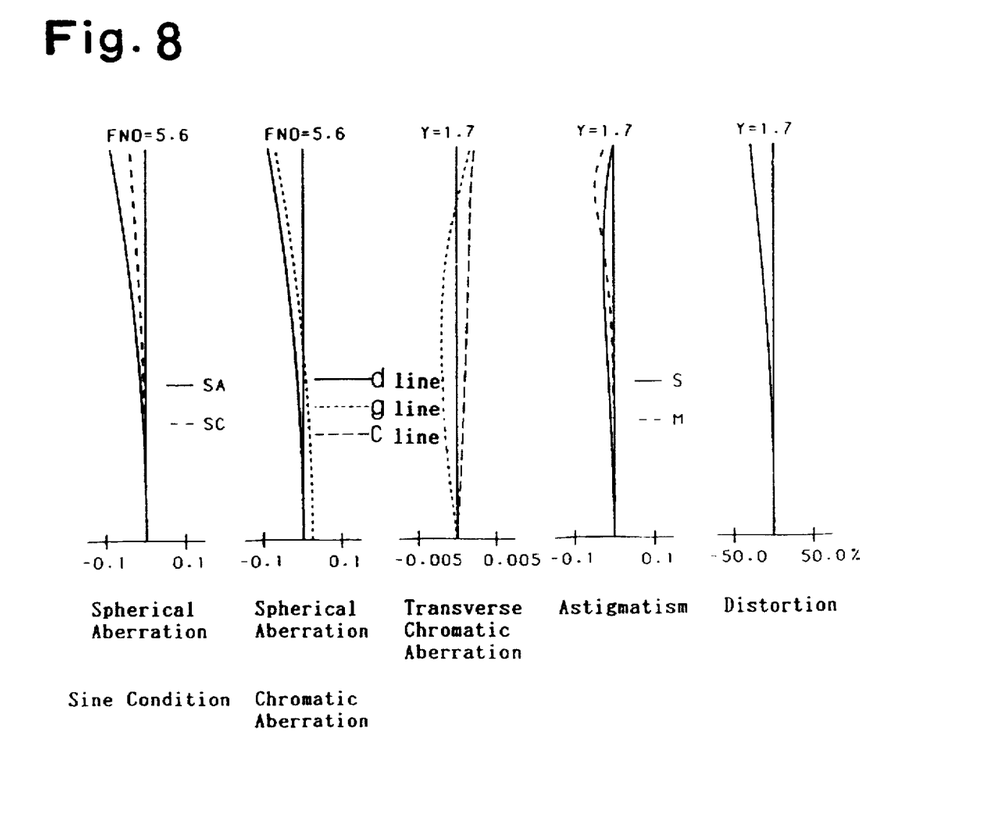
FIG. 8 shows various aberration diagrams of the objective lens shown in FIG. 7.

Numerical data of the lens system shown in FIG. 7 is shown in Table 4 below. Diagrams of various aberrations thereof are shown in FIG. 8.

TABLE 4

$F_{NO} = 1:5.6$
$f = 1.68$
$M = -0.139$
$\omega = 53.8°$
$Y = 1.7$

| surface No. | $r_i$ | $d_i$ | N | ν |
|---|---|---|---|---|
| 1 | ∞ | 1.47 | 1.88300 | 40.8 |
| 2 | 1.399 | 0.07 | — | — |
| STOP | ∞ | 0.02 | — | — |
| 3 | ∞ | 1.26 | 1.77250 | 49.6 |
| 4 | −1.141 | 0.05 | — | — |
| 5 | 8.039 | 0.30 | 1.80518 | 25.4 |
| 6 | 1.682 | 0.91 | 1.72916 | 54.7 |
| 7 | −2.799 | 0.05 | — | — |
| 8 | 2.908 | 0.30 | 1.75520 | 27.5 |
| 9 | 1.504 | 0.82 | — | — |
| 10 | ∞ | 0.50 | 1.52400 | 69.0 |
| 11 | ∞ | 1.00 | 1.53996 | 59.5 |
| 12 | ∞ | — | — | — |

Fifth Embodiment

Figure 9:
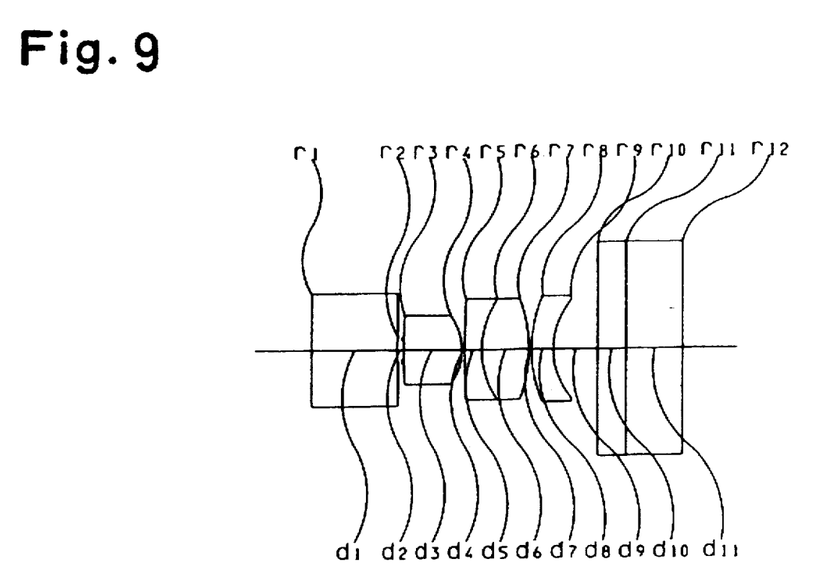
FIG. 9 is a schematic view of a lens arrangement of an objective lens for an endoscope, according to a fifth embodiment of the present invention.

FIG. 9 shows a lens arrangement of an objective lens according to a fifth embodiment of the present invention.

Figure 10:
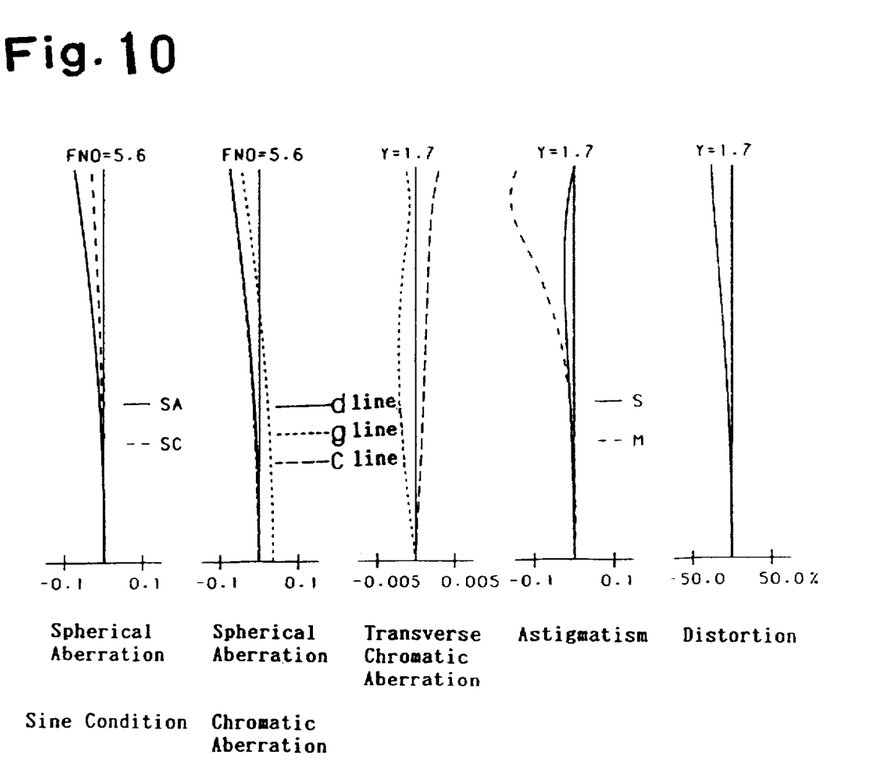
FIG. 10 shows various aberration diagrams of the objective lens shown in FIG. 9.

Numerical data of the lens system shown in FIG. 9 is shown in Table 5 below. Diagrams of various aberrations thereof are shown in FIG. 10.

TABLE 5

$F_{NO} = 1:5.6$
$f = 1.63$
$M = -0.134$
$\omega = 53.3°$
$Y = 1.7$

| surface No. | $r_i$ | $d_i$ | N | ν |
|---|---|---|---|---|
| 1 | ∞ | 1.52 | 1.88300 | 40.8 |
| 2 | 1.066 | 0.10 | — | — |
| STOP | ∞ | 0.02 | — | — |
| 3 | 7.378 | 1.06 | 1.77250 | 49.6 |
| 4 | −1.050 | 0.05 | — | — |
| 5 | 16.536 | 0.30 | 1.80518 | 25.4 |
| 6 | 1.567 | 0.83 | 1.72916 | 54.7 |
| 7 | −2.531 | 0.05 | — | — |
| 8 | 2.348 | 0.37 | 1.75520 | 27.5 |
| 9 | 1.333 | 0.78 | — | — |
| 10 | ∞ | 0.50 | 1.52400 | 69.0 |
| 11 | ∞ | 1.00 | 1.53996 | 59.5 |
| 12 | ∞ | — | — | — |

Sixth Embodiment

Figure 11:
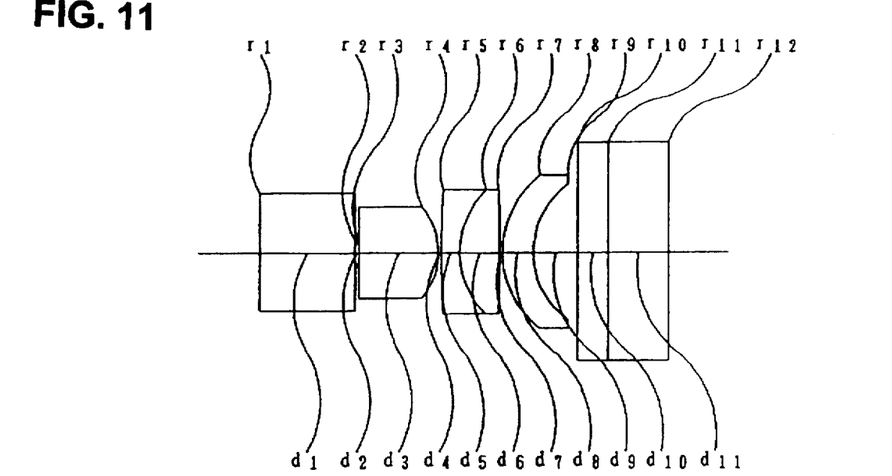
FIG. 11 is a schematic view of a lens arrangement of an objective lens for an endoscope, according to a sixth embodiment of the present invention.

FIG. 11 shows a lens arrangement of an objective lens according to a sixth embodiment of the present invention.

Figure 12:
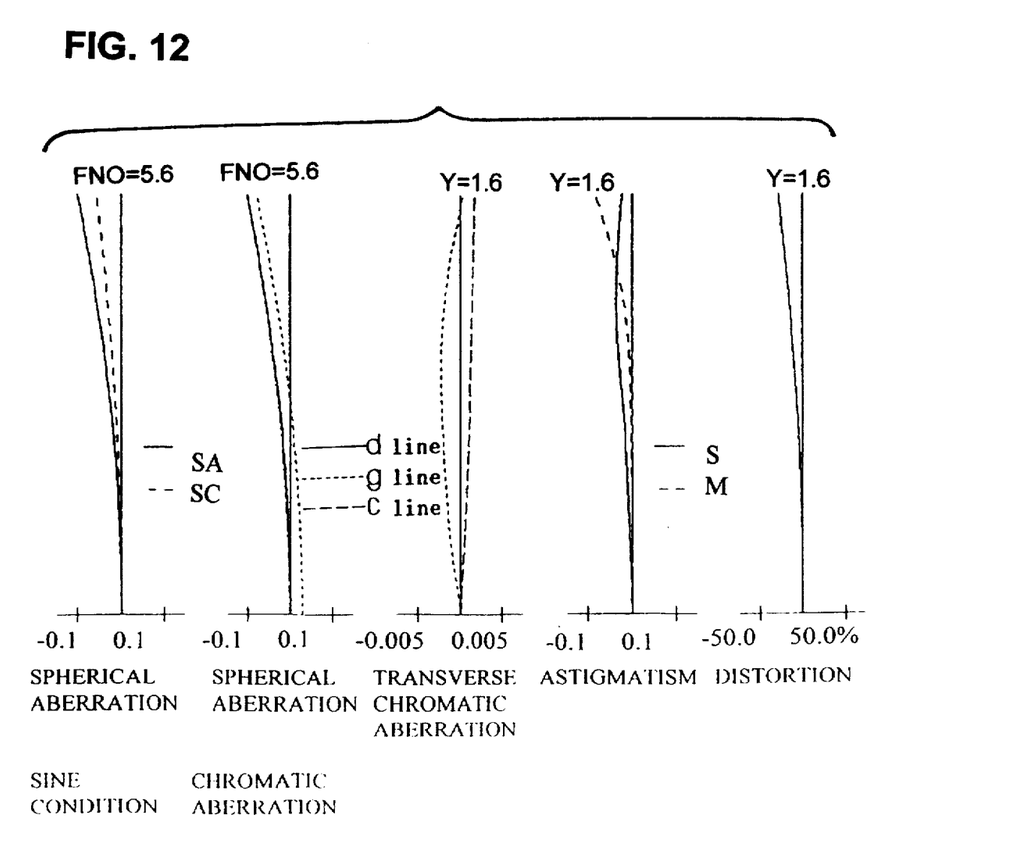
FIG. 12 shows various aberration diagrams of the objective lens shown in FIG. 11.

Numerical data of the lens system shown in FIG. 11 is shown in Table 6 below. Diagrams of various aberrations thereof are shown in FIG. 12.

TABLE 6

$F_{NO} = 1:5.6$
$f = 1.77$
$M = -0.148$
$\omega = 49.9°$
$Y = 1.6$

| surface No. | $r_i$ | $d_i$ | N | ν |
|---|---|---|---|---|
| 1 | ∞ | 1.55 | 1.88300 | 40.8 |
| 2 | 1.892 | 0.05 | — | — |
| STOP | ∞ | 0.02 | — | — |
| 3 | ∞ | 1.33 | 1.77250 | 49.6 |
| 4 | −1.122 | 0.05 | — | — |
| 5 | 20.684 | 0.30 | 1.80518 | 25.4 |

TABLE 6-continued $F_{NO} = 1:5.6$
$f = 1.77$
$M = -0.148$
$\omega = 49.9°$
$Y = 1.6$

| surface No. | $r_i$ | $d_i$ | N | $\nu$ |
|---|---|---|---|---|
| 6 | 1.418 | 0.65 | 1.72916 | 54.7 |
| 7 | −29.304 | 0.05 | — | — |
| 8 | 1.647 | 0.48 | 1.75520 | 27.5 |
| 9 | 1.419 | 0.70 | — | — |
| 10 | ∞ | 0.50 | 1.52400 | 69.0 |
| 11 | ∞ | 1.00 | 1.53996 | 59.5 |
| 12 | ∞ | — | — | — |

Seventh Embodiment

Figure 13:
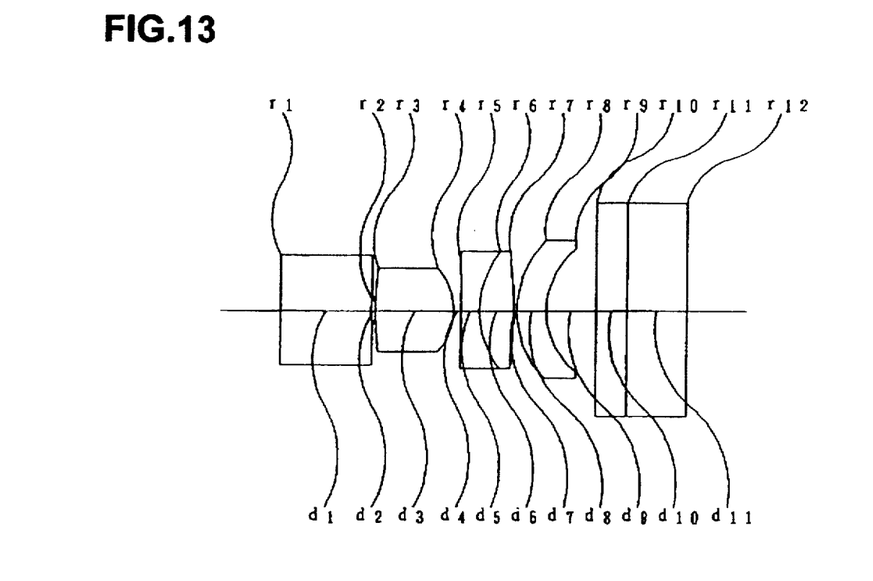
FIG. 13 is a schematic view of a lens arrangement of an objective lens for an endoscope, according to a seventh embodiment of the present invention; and, FIG. 14 shows various aberration diagrams of the objective lens shown in FIG. 13.

FIG. 13 shows a lens arrangement of an objective lens according to a seventh embodiment of the present invention.

Figure 14:
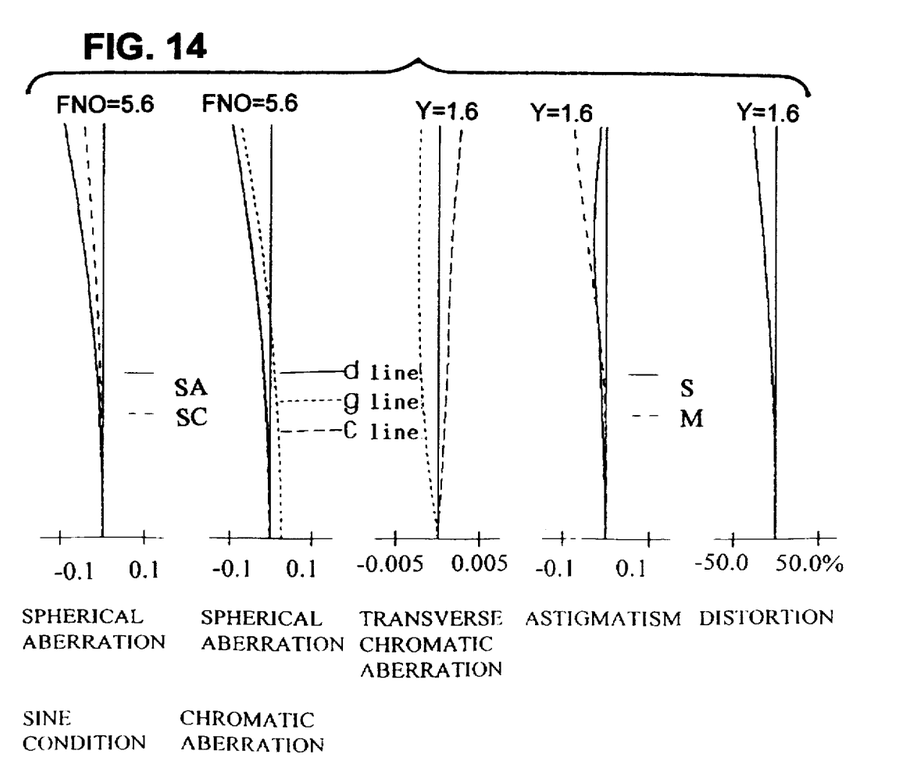

Numerical data of the lens system shown in FIG. 13 is shown in Table 7 below. Diagrams of various aberrations thereof are shown in FIG. 14.

TABLE 7

$F_{NO} = 1:5.6$
$f = 1.75$
$M = -0.145$
$\omega = 49.7°$
$Y = 1.6$

| surface No. | $r_i$ | $d_i$ | N | $\nu$ |
|---|---|---|---|---|
| 1 | ∞ | 1.50 | 1.88300 | 40.8 |
| 2 | 1.331 | 0.05 | — | — |
| STOP | ∞ | 0.02 | — | — |
| 3 | 7.143 | 1.31 | 1.77250 | 49.6 |
| 4 | −1.085 | 0.13 | — | — |
| 5 | −43.866 | 0.32 | 1.80518 | 25.4 |
| 6 | 1.591 | 0.59 | 1.72916 | 54.7 |
| 7 | −6.830 | 0.05 | — | — |
| 8 | 1.651 | 0.49 | 1.75520 | 27.5 |
| 9 | 1.366 | 0.80 | — | — |
| 10 | ∞ | 0.50 | 1.52400 | 69.0 |
| 11 | ∞ | 1.00 | 1.53996 | 59.5 |
| 12 | ∞ | — | — | — |

The values of formulae (1) through (5) in each embodiment are shown in Table 8 below.

TABLE 8

| | formula(1) | formula(2) | formula(3) |
|---|---|---|---|
| Embodiment 1 | −0.671 | 0.717 | −3.267 |
| Embodiment 2 | −0.775 | 0.692 | −2.928 |
| Embodiment 3 | −0.947 | 0.700 | −2.750 |
| Embodiment 4 | −0.941 | 0.696 | −2.698 |
| Embodiment 5 | −0.740 | 0.674 | −2.969 |
| Embodiment 6 | −1.209 | 0.812 | −90.3 |
| Embodiment 7 | −0.864 | 0.751 | −22.9 |

| | formula(4) | formula(5) | |
|---|---|---|---|
| Embodiment 1 | 0.978 | 1.978 | |
| Embodiment 2 | 0.886 | 1.763 | |
| Embodiment 3 | 0.888 | 1.715 | |
| Embodiment 4 | 0.893 | 1.704 | |
| Embodiment 5 | 0.817 | 1.631 | |
| Embodiment 6 | 0.801 | 1.614 | |
| Embodiment 7 | 0.783 | 1.656 | |

As can be seen from Table 8 above, all seven of the embodiments satisfy the requirements defined by formulae (1) through (5). Moreover, an objective lens for an endoscope according to the present invention has a small transverse chromatic aberration and can effectively correct other aberrations.

The values of formulae (6) through (8) in each embodiment are shown in Table 9 below.

TABLE 9

| | formula(6) | formula(7) | formula(8) |
|---|---|---|---|
| Embodiment 1 | −0.628 | 0.635 | 1.719 |
| Embodiment 2 | −0.654 | 0.829 | 1.738 |
| Embodiment 3 | −0.685 | 1.018 | 1.751 |
| Embodiment 4 | −0.679 | 1.001 | 1.751 |
| Embodiment 5 | −0.644 | 0.961 | 1.751 |
| Embodiment 6 | −0.633 | 0.800 | 1.751 |
| Embodiment 7 | −0.622 | 0.912 | 1.780 |

As can be seen from Table 9 above, all seven embodiments satisfy the requirements defined by formulae (6) through (8).

As may be understood from the above discussion, according to the present invention, the distortion of an objective lens for an endoscope can be effectively restricted or eliminated by the spherical lenses in combination, without using an aspherical lens. Moreover, according to the present invention, an inexpensive objective lens for an endoscope can be obtained.

We claim:

1. An objective lens for an endoscope, comprising:

a first lens group consisting of a negative lens;

a second lens group having a positive power;

a third lens group having a negative power; and an aperture stop that defines the f number of the objective lens, wherein said first lens group, said aperture stop, and said second lens group are arranged in this order from an object side of said objective lens, wherein said negative lens is positioned closest to said object side of said objective lens, and wherein no optical elements are positioned between said first lens group and said aperture stop and between said aperture stop and said second lens group.

2. The objective lens for an endoscope according to claim 1, wherein said objective lens satisfies the relationships:

$-1.4 < f_1/f < -0.5$, $0.55 < f_2/f < 0.85$, and $f_3/f < -2.0$, wherein f designates a focal length of the entire objective lens, $f_1$ designates a focal length of said first lens group, $f_2$ designates a focal length of said second lens group, and $f_3$ designates a focal length of said third lens group.

3. The objective lens for an endoscope according to claim 1, said third lens group comprises a negative meniscus lens having a convex surface on the object side.

4. The objective lens for an endoscope according to claim 3, said objective lens satisfies the relationships:

$0.7 < R_L/f < 1.2$, and $1.2 < L_A/f < 2.5$, wherein $R_L$ designates a radius of curvature of an image side surface of said negative meniscus lens; and $L_A$ designates a distance between said aperture stop and the image side surface of said negative meniscus lens; and f designates a focal length of the whole lens system.

5. The objective lens for an endoscope according to claim 1, said second lens group comprises a positive sub-lens and a cemented sub-lens pair consisting of a positive and a negative lens.

6. The objective lens for an endoscope according to claim 5, said objective lens satisfies the relationships:

$-0.75 < R_A/f < -0.55$, $0.50 < |R_B|/f < 1.30$, and $1.67 < N_2$, wherein $R_A$ designates a radius of curvature of a surface of said positive sub-lens that is located on an image side, $R_B$ designates a radius of curvature of a cemented surface of said cemented sub-lens pair, $N_2$ designates an average value of a refractive index of the positive sub-lens and the positive lens of said cemented sub-lens pair; and f designates a focal length of a whole lens system.

7. The objective lens for an endoscope according to claim 1, said third lens group consisting of a negative lens.

8. An objective lens for an endoscope, comprising:

a first lens group comprising a negative lens;

a second lens group having a positive power;

a third lens group having a negative power, said third lens group comprising a negative meniscus lens having a convex surface facing an object side of said objective lens;

an aperture stop provided between said first lens group and said second lens group;

wherein said objective lens satisfies the relationships:

$0.7 < R_L/f < 1.2$, and $1.2 < L_A/f < 2.5$, wherein $R_L$ designates a radius of curvature of an image side surface of said negative meniscus lens;

$L_A$ designates a distance between said aperture stop and the image side surface of said negative meniscus lens; and f designates a focal length of said objective lens.

9. The objective lens for an endoscope according to claim 8, said first lens group, said aperture stop, and said second lens group being arranged in this order from the object side, and wherein no lenses are positioned between said first lens group and said aperture stop and between said aperture stop and said second lens group.

10. An objective lens for an endoscope, comprising:

a first lens group comprising a negative lens;

a second lens group having a positive power, said second lens group comprising a positive sub-lens and a cemented sub-lens pair consisting of a positive lens and a negative lens;

a third lens group having a negative power;

an aperture stop provided between said first lens group and said second lens group;

wherein said objective lens satisfies the relationships:

$-0.75 < R_A/f < -0.55$, $0.50 < |R_B|/f < 1.30$, and $1.67 < N_2$, wherein $R_A$ designates a radius of curvature of a surface of said positive sub-lens that is located on an image side of said objective lens, $R_B$ designates a radius of curvature of a cemented surface of said cemented sub-lens pair, $N_2$ designates an average value of a refractive index of the positive sub-lens and the positive lens of said cemented sub-lens pair, and f designates a focal length of said objective lens.

11. The objective lens for an endoscope according to claim 10, said first lens group, said aperture stop, and said second lens group being arranged in this order from the object side, and wherein no lenses are positioned between said first lens group and said aperture stop and between said aperture stop and said second lens group.

12. The objective lens for an endoscope according to claim 10, said third lens group consisting of a negative lens.

* * * * *